US005146977A

United States Patent [19]
Kiser

[11] Patent Number: 5,146,977
[45] Date of Patent: Sep. 15, 1992

[54] ENVIRONMENTAL CONTROL IN A CONFINED WORKPLACE

[75] Inventor: Thomas E. Kiser, Fremont, Ohio

[73] Assignee: Professional Supply, Inc., Fremont, Ohio

[21] Appl. No.: 732,592

[22] Filed: Jul. 19, 1991

Related U.S. Application Data

[63] Continuation-in-part of Ser. No. 665,352, Mar. 6, 1991.

[51] Int. Cl.$^5$ ............................................. B64D 13/04
[52] U.S. Cl. .................................... 165/15; 621/176.4; 621/201
[58] Field of Search ................ 165/15; 62/201, 121, 62/176.4, 176.6; 236/44 R

[56] References Cited

U.S. PATENT DOCUMENTS

| | | | |
|---|---|---|---|
| 2,282,210 | 5/1942 | Plum | 165/15 X |
| 3,859,812 | 1/1975 | Pavlak | 62/201 X |
| 4,069,030 | 1/1978 | Nickell et al. | 62/176.4 |

*Primary Examiner*—William E. Wayner
*Attorney, Agent, or Firm*—Marshall & Melhorn

[57] ABSTRACT

In an industrial building housing a production operation utilizing a liquid material exposed to the atmosphere, a relationship is maintained between the plant atmosphere and the liquid material whereby the atmosphere is not receptive to vaporized or atomized portions of the liquid. The building is maintained under a slight positive pressure throughout to prevent random and uncontrolled infiltration of outside atmosphere. The temperature and relative humidity of the building atmosphere and the temperature of the liquid are closely monitored and maintained at levels relative to one another which assure that the building atmosphere is not receptive to evaporated or atomized liquid. Air handling units for supplying conditioned air to the building interior include heat exchangers and evaporators for regulating the wet bulb and dry bulb temperatures of the air being admitted to the building interior, and thus the temperature and relative humidity of the atmosphere within the building. The liquid material recirculates through a heat exchanger for removal of accumulated heat as necessary to maintain it at a temperature relative to the dry bulb/wet bulb temperatures of the building atmosphere below that at which it would tend to migrate by vaporization or atomization into the building atmosphere.

32 Claims, 3 Drawing Sheets

ENVIRONMENTAL CONTROL IN A CONFINED WORKPLACE

This application is a continuation-in-part of application Ser. No. 07/665,352, filed Mar. 6, 1991.

BACKGROUND OF THE INVENTION

1. Field of the Invention

The present invention pertains broadly to regulation of atmospheric conditions within an enclosed workplace, and more particularly to regulation of such conditions within a workplace wherein materials are employed which tend to become entrained in the atmosphere, in such a manner as to discourage such materials from entering the atmosphere and creating undesirable atmospheric conditions.

2. Description of the Prior Art

Industrial buildings often house manufacturing processes in which various volatile materials are employed as an adjunct of the process. Thus, in various grinding and machining processes liquid compounds are liberally applied over the tool and workpiece to serve as a coolant and lubricant. The spent compound is generally collected, purified and recirculated for repeated use in the process. During at least a part of the time during which the compound is being used and reused it is exposed to the atmosphere so that under appropriate conditions it tends to migrate into the building atmosphere. Inasmuch as the compound absorbs heat created by friction at the tool-workpiece interface as it flows thereover, its temperature may rise above that of the ambient atmosphere, thereby increasing its tendency to vaporize. The presence of the coolant/lubricant in the building atmosphere is highly objectionable from an environmental standpoint, and the loss of the material from the system represents a significant economic factor. In addition, the material tends to condense and drop out of the atmosphere, creating an unsightly and unsafe workplace.

Heretofore, attempts at remedying the situation have generally been directed toward exhausting the vaporized compound from the building at the source before it can disperse throughout the building atmosphere. To that end, it has been suggested to install exhaust hoods over the individual machines. The hoods are ducted to the exterior, and large, high capacity fans withdraw compound-laden atmosphere through the hoods and exhaust it to the external atmosphere. Filters are generally provided in the hoods for condensing or precipitating vaporized material. While such ventilation systems are helpful in reducing dispersal of compound-laden atmosphere throughout the building, they do not entirely resolve the problem. Thus, not all of the building atmosphere into which the compound evaporates throughout the recirculating system is collected by the exhaust hoods. The hoods exhaust large volumes of air from the building interior, and thus large amounts of energy are consumed in removing the coolant/lubricant laden air and in conditioning and replacing the exhausted air. The exhausted air also carries a certain amount of coolant/lubricant out of the building, which is potentially objectionable as an air pollutant and which requires replenishment in the recirculation system. Such exhaust systems thus are neither completely effective nor cost efficient in operation.

It will be readily appreciated that while the invention is described herein as utilized in conjunction with coolant/lubricant employed in a machining or grinding operation, it may be employed as well with other processes employing other and different materials which might tend to become dispersed in the atmosphere.

SUMMARY OF THE INVENTION

In accordance with the present invention the plant air and the liquid coolant/lubricant compound or other process liquid are conditioned so that a harmonious relationship is maintained therebetween whereby evaporation of the coolant/lubricant into the atmosphere is effectively eliminated. The source of the problem is thus eliminated, and remedial action is unnecessary. More particularly, the building in which the equipment is located is maintained under a slight positive pressure throughout relating to the outside atmosphere to prevent random and uncontrolled infiltration of outside atmosphere. Air handling units strategically located about the building admit a combination of conditioned outside and building return air to the building interior in controlled amounts so as to maintain the building pressurization and control migration of air within the building. Various atmospheric conditions, including pressure relative to the adjacent outside atmospheric pressure, temperature and relative humidity are continuously monitored at strategic locations throughout the building. Signals generated in response to the observed conditions are periodically compared to stored data indicative of desired atmospheric conditions at those locations, and the air handling units are individually controlled to supply conditioned air in amounts required to maintain the various atmospheric conditions throughout the building within predetermined desired parameters.

In order to effectively eliminate migration of the coolant/lubricant or other liquid into the building atmosphere, the temperature and relative humidity of the building atmosphere and the temperature of the recirculating coolant/lubricant compound are closely monitored and maintained at levels which assure that the building atmosphere is not receptive to evaporated or atomized coolant/lubricant. The air handling units for supplying conditioned air to the building interior include heat exchangers and enthalpy controlled evaporators for regulating the wet bulb and dry bulb temperature conditions of the air being admitted to the building, and thus the temperature and relative humidity of the atmosphere within the building. The coolant/lubricant compound passes through a heat exchanger as it recirculates through the process system in order to remove heat and maintain the material at a temperature below that at which it would tend to migrate by evaporation or atomization into the controlled building atmosphere.

It is, therefore, a primary object of the invention to provide a system for maintaining atmospheric conditions within prescribed parameters in industrial-type buildings.

Another object of the invention is to improve the hygienic quality of the atmosphere within such buildings.

Another object of the invention is to improve the environment for workers in buildings housing processes utilizing liquids tending to migrate into the building atmosphere.

Still another object of the invention is to minimize loss of liquid compounds employed in production processes carried on within such buildings through evaporation and atomization.

Yet another object of the invention is to provide such a system which reduces energy requirements while maintaining atmospheric conditions within prescribed parameters.

Other objects and advantages of the invention will become more apparent during the course of the following description, when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENTS

Figure 1:
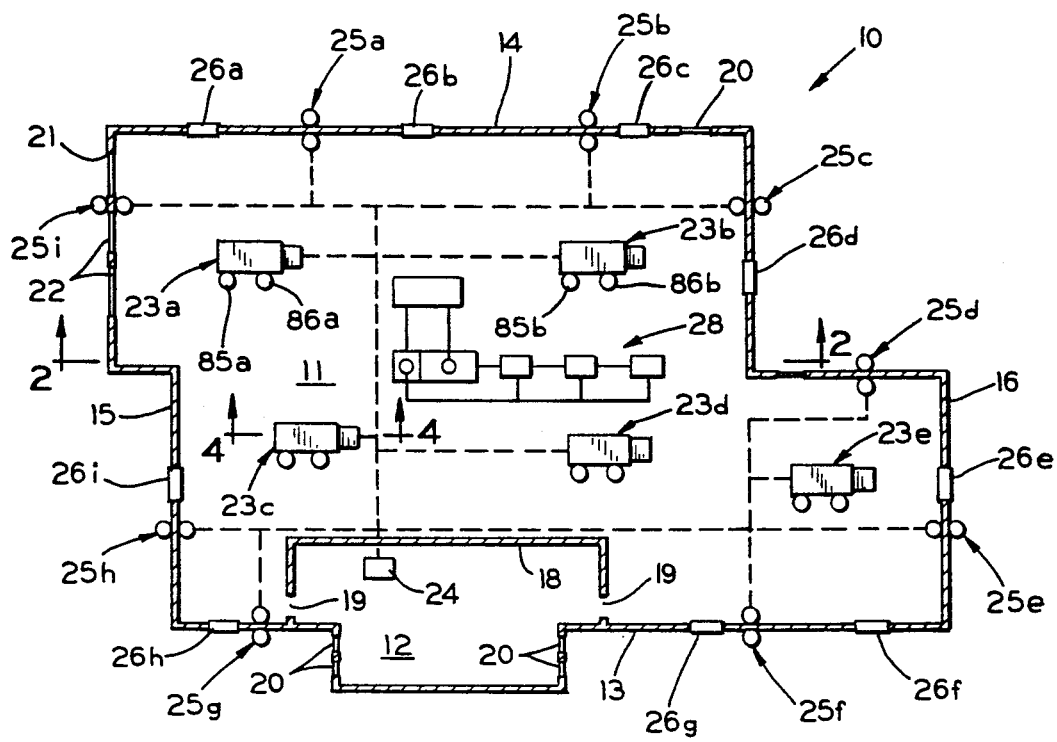
FIG. 1 is a schematic plan view of an industrial-type building housing a machining operation employing a process coolant/lubricant and embodying the invention.

With reference to the drawings, and particularly to FIG. 1 thereof, there is shown generally at 10 an industrial building typical of those employed as industrial plants, warehouses and the like. Such buildings may be of various configurations as deemed appropriate for their intended use, and may range in size from a few thousand square feet to several hundred thousand square feet or more. Such facilities may include a large open area 11 in which manufacturing, processing, warehousing and the like activities are carried on, and a smaller enclosed area 12 utilized for office or administrative purposes.

The building structure for which the invention is particularly adapted generally comprises front and rear walls 13 and 14, respectively, and oppositely disposed end walls 15 and 16, covered by a roof structure 17, generally of the flat type. The enclosed area 12 may be separated from the open area 11 as by an interior wall 18. A suitable dropped ceiling (not shown) may be provided over the enclosed area beneath the roof structure 17. Doors 19 in the wall 18 provide access between the enclosed area 12 and the open area 11. Additional doors 20 may be provided at various locations for permitting access to the building by workers, and windows (not shown) may be provided for admitting light. A loading dock area having one or more large doorways 21, with suitable closure means such as overhead doors 22, is adapted to accommodate trucks or railroad cars for receiving and shipping goods.

A building pressurization system for regulating atmospheric conditions within buildings as heretofore described is disclosed in U.S. Pat. Nos. 4,850,264 and 4,960,041, the disclosures of which are herein incorporated by reference. In accordance with the inventions as fully described in the aforementioned patents, a so-called global control concept is utilized wherein the building interior defines an essentially enclosed system, with sufficient outside air being admitted through air handling units positioned about the building to replenish lost atmosphere and continuously maintain the interior of the building under a slight positive pressure throughout relative to outside atmospheric pressure. Controllable vents are provided at strategic locations around the perimeter of the building, and sensing units are located throughout the building interior to monitor atmospheric conditions such as temperature, humidity and the level of particulates and pollutants. The present invention is particularly adapted to utilization with such a system.

To that end there is located on the roof 17 of the building a number of air handling units 23 for directing conditioned air into the interior of the building in a manner to be described. The number and location of the units will depend upon the size and configuration of the building, and they may in some instances be located along the walls of the building rather than upon the roof. In the illustrated embodiment five such units, designated 23a through 23e, are provided on the roof and located so as to assure ready delivery of conditioned air from the units to all areas of the building interior. The individual air handling units are linked to and suitably controlled by a central computer 24 located as in the enclosed office or administrative area 12.

In accordance with the global control feature as set forth in detail in the aforementioned U.S. patents, for operation with which the present invention is particularly adapted, a slight positive pressure is maintained throughout the interior of the building. In other words, the interior pressure is maintained slightly above the outside pressure around the perimeter of the building as well as throughout the building. To that end, pressure sensors may be provided at various locations around the perimeter, both within the building and around the outside for observing local atmospheric pressures and generating signals indicative thereof for transmission to the central computer 24. The sensors may advantageously be, for example, a series of conventional pressure transducers 25a through 25i positioned at selected locations around the peripheral walls of the building. Such transducers conventionally include means for determining the pressure differential between the interior and exterior of the building at their particular location. A signal indicative of the pressure differential is generated and periodically transmitted to the central computer 24. Of course, additional pressure sensors (not shown) may be located throughout the building as deemed appropriate for observing pressures and providing comparative data for use in controlling air movement within the building.

In order to assist in controlling air movement within the building, as well as to provide for selective removal of atmosphere determined to fall outside predetermined air quality parameters, adjustable relief dampers or vent units 26 are provided in the walls 13, 14, 15, and 16 at selected locations around the perimeter of the building as shown at 26a through 26i. Each relief damper includes a control motor 27 which is operatively linked to the central computer 24. The dampers are thus individually controlled in response to signals from the central computer.

There is located within the building a production facility, identified generally at 28, which openly employs a vaporizable liquid material as an adjunct of the production procedure. For purposes of explanation, the line will be illustrated and described as being a machining line as for automotive engine blocks. However, it will be understood that the invention is applicable as well to buildings housing other and different processes employing liquid materials in such a manner as to permit their escape to the building atmosphere. For example, the process might involve the spraying of paint or other liquids onto workpieces. Likewise, it will be understood that in accordance with the invention the building may contain a number of production facilities, each of which may be independently operated but controlled by the central computer.

Figure 2:
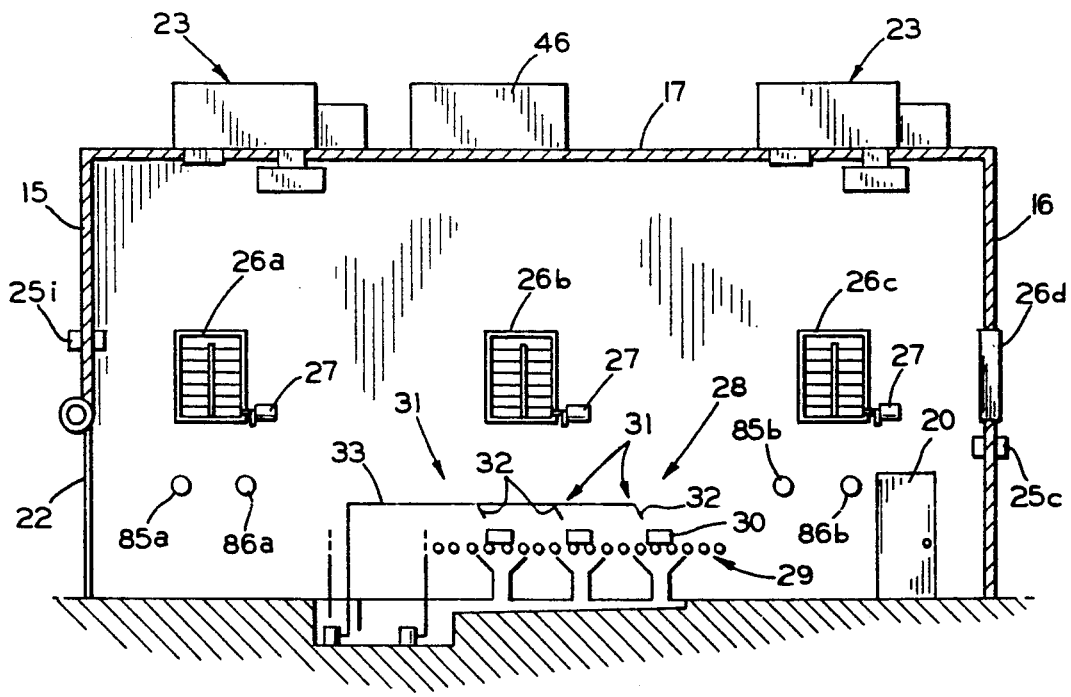
FIG. 2 is a vertical section taken substantially along line 2—2 of FIG. 1.
Figure 5:
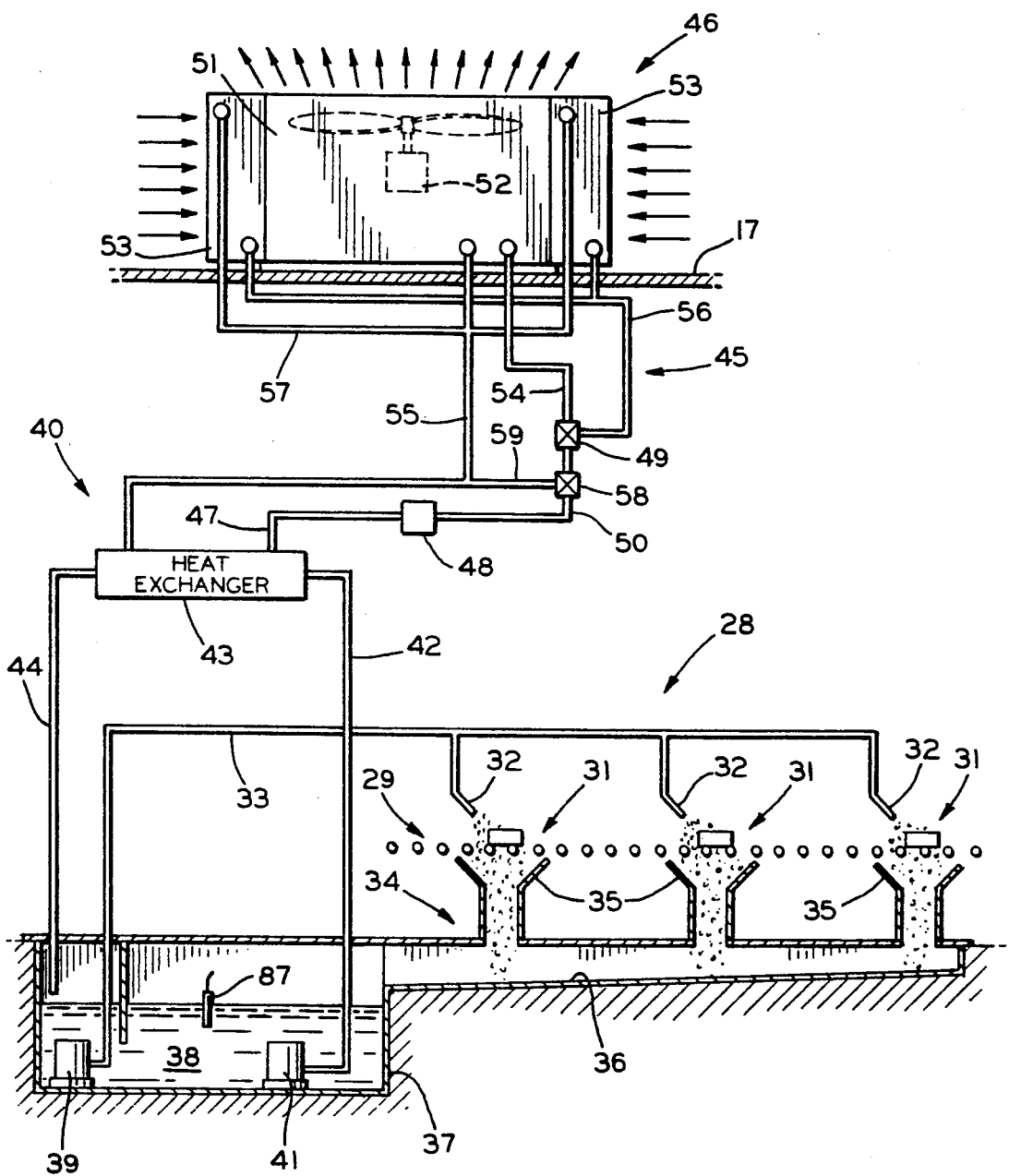
FIG. 5 is an enlarged, fragmentary elevational view, partly in section, schematically illustrating the tooling coolant/lubricant recirculating system of the invention.

More particularly, as illustrated schematically and as best seen in FIGS. 1, 2 and 5, the facility 28 comprises a roller conveyor line 29 along which parts 30 such as automobile engine blocks are carried through a series of machining stations 31 at which machining operations are performed on the blocks by appropriate equipment (not shown). At each machining station there is provided one or more tubes 32 positioned to direct a stream or spray of liquid coolant/lubricant compound onto the tool and workpiece. The tubes 32 are connected to a manifold line 33 through which a supply of the coolant/lubricant is distributed from a recirculating system as will be described.

To that end, as best seen in FIG. 5 there is provided beneath the conveyor line a collecting system, identified generally at 34, and including at each machining station 31 a basin 35 for receiving spent coolant/lubricant from the machining operation. The basins deposit the material collected from the various machining stations into a channel or flume 36 through which it flows to a settling basin or sump 37. Debris from the machining carried with the coolant/lubricant is removed as by filtration and/or settling, and the purified material returns to the reservoir 38 of coolant/lubricant for recirculation by a pump 39 through the manifold line 33.

Heat is created, of course, as the parts are machined, and the coolant/lubricant flowing over the machine tool and part absorbs heat therefrom and consequently the temperature of the recirculating liquid medium tends to increase. Heretofore controlling the temperature of the compound was not deemed important, and the compound was generally allowed to increase in temperature until an equilibrium point was reached as it recirculated through the system. Heat was removed by evaporation of the recirculating compound, and the temperature of the compound was thus dependent to a certain extent upon factors such as the temperature and relative humidity within the building and the opportunity for the compound to evaporate into the building atmosphere, and might exhibit considerable seasonal variation. In accordance with the present invention, it is imperative that the compound be maintained at a temperature below a predetermined level in order to permit establishment of relative humidity and temperature conditions which will tend to preclude dispersal of the compound into the building atmosphere.

As best seen in FIG. 5, there is provided a system 40 for controllably removing heat from the coolant/lubricant and maintaining the temperature of the compound 39 in the reservoir for recirculation below a predetermined level. As will be readily appreciated, any of a number of systems may be employed for removing heat from the liquid coolant/lubricant. The system best suited for any particular installation will depend upon a number of factors including geographic location, climate, outside temperature ranges and energy costs, among others. It is, of course, necessary for the system to be capable of removing heat from the fluid throughout the year under conditions of outside temperature which may vary widely between summer and winter. It is also desirable for the system to operate economically.

A system 40 suitable for economical operation year around in a climate subject to substantial temperature difference between summer and winter is illustrated in FIG. 5. As shown therein, compound 38 from the reservoir is forced by a pump 41 into a pressure line 42 and through a liquid-liquid heat exchanger 43 of conventional construction. Heat is extracted from the compound within the heat exchanger and the cooled compound is returned to the reservoir through a return line 44. The pump 41 and heat exchanger 43 are suitably controlled as will be hereinafter explained so as to provide a predetermined drop in the temperature, for example 10° F., of the compound and to maintain the temperature of the compound in the reservoir below the predetermined level.

Heat removed from the coolant/lubricant in the exchanger 43 is emitted to the ambient atmosphere by means of a transfer system 45 including a cooling unit 46 located as on the roof 17 of the building. For purposes of economy, the heat transfer system is adapted for winter and summer modes of operation and to that end the cooling unit provides for removal of heat from the liquid heat exchange medium in the cooling unit by both ambient outside air and mechanical refrigeration. Thus, when the outside air temperature is sufficiently below that required for the reservoir 38 of tooling coolant/lubricant, the cooling unit will utilize the ambient air to cool the heat exchange medium. When the outside air temperature is above that required for suitably cooling the heat exchange medium, the medium is cooled by the mechanical refrigeration unit.

With reference now to FIG. 5, in the heat transfer system 45 liquid heat exchange medium is circulated from the heat exchanger 43 through a line 47 by a heat transfer system pump unit 48 into and through the cooling unit 46. As hereinbefore explained, the cooling unit includes alternate modes for cool weather and warm weather operation. Accordingly, a selector valve 49 is provided in an outlet line 50 from the pump unit for selectively directing the heat exchange medium through either a cool weather or a warm weather loop of the cooling unit.

The cooling unit more particularly comprises a housing 51 within which is contained a refrigeration unit (not shown) and a fan, shown in phantom at 52, for drawing ambient air in through the sides and discharging it upwardly as indicated by the arrows. The cooling unit is additionally fitted with conventional heat exchange coils (not shown) within a compartment 53 at each side of the unit. As embient atmospheric air is drawn in through the sides of the unit and discharged through the top, it passes over the coils within the compartments 53 as well as the heat exchanger of the refrigeration unit in heat exchange relationship with each.

For operation in the warm weather mode, the selector valve 49 is set so that the heat exchange medium is directed by means of a line 54 into and through the refrigeration unit within the cooling unit 46 and back to the process heat exchanger through a return line 55. Heat is extracted from the heat exchange medium in passing through the refrigeration unit so that a temperature differential is created in the medium between the lines 54 and 55. For cold weather operation the selector valve 49 is set to direct the medium through a distributor line 56 into and through the heat exchange coils in each of the compartments 53 and back to the heat exchanger 43 by means of connecting lines 57 and the return line 55. Heat is, of course, removed from the exchange medium by the relatively cooler ambient air as the medium passes through the coils of the compartments 53.

It is generally desirable to maintain a substantially uniform temperature differential between the heat exchange medium entering and leaving the heat exchanger 43 so as to, in turn, create a substantially uniform temperature differential in the process coolant/lubricant passing through the heat exchanger. By way of example, in order to maintain the coolant/lubricant in the reservoir 38 at an average temperature not greater than about 60° F., spent coolant/lubricant from the machining operation may be pumped to the exchanger 43 at a temperature of about 65° F. and returned to the reservoir at a temperature of about 55° F. In order to achieve this temperature drop in the coolant/lubricant, the heat exchange medium may leave the heat exchanger 43 at a temperature of about 60° F. and return to the exchanger at a temperature of about 50° F. To assure maintenance of a predetermined uniform temperature differential between the outgoing and incoming heat exchange medium, a conventional modulating or mixing valve 58 may be provided in the outlet line 50 from the pump unit 48, and connected to the return line 55 by a line 59 so as to selectively regulate the proportion of the heat exchange medium flowing through the cooling unit. The valve is provided with suitable conventional controls (not shown) for monitoring the temperature of the heat exchange medium in the lines 47 and 55 and adjusting the modulating valve 58 as appropriate to maintain the predetermined temperature levels. The temperature of the coolant/lubricant in the reservoir 38, as well as the temperature of the heat exchange medium in the transfer system 45, is monitored and controlled by the central computer 24 to assure maintenance of compatibility between the temperature of the coolant/lubricant and the building atmospheric conditions in accordance with the invention.

The air handling units 23 as heretofore indicated are adapted to supply conditioned air in controlled amounts to the building interior so as to maintain selected atmospheric conditions throughout the building within predetermined parameters. Such industrial buildings are generally not air-conditioned, and thus the air handling unit 23 as shown in detail in FIG. 4 does not include a chiller unit. However, it is fully contemplated that in accordance with the invention the building may as well be air-conditioned, and a chiller or refrigeration unit may be readily incorporated into the air handling unit in a conventional manner.

As hereinbefore indicated, in accordance with the invention indoor wet and dry bulb temperature conditions, as well as the temperature of the liquid coolant/lubricant, are simultaneously regulated and maintained in a predetermined relationship so as to eliminate evaporation of the coolant/lubricant compound at its source. To that end the air handling units 23 are adapted to not only admit air to the building interior in controlled amounts so as to maintain the desired pressurization of the building interior, but also to control the temperature and relative humidity of the building atmosphere. Each of the air handling units more particularly comprises a box-like housing 60 of generally rectangular configuration mounted on the roof 17 and having at one end a drive motor cabinet 61. The housing 60 includes a fan chamber section 62 within which an impeller 63 is operably mounted and journalled for rotation on a shaft 64. The shaft extends into the motor cabinet 61 and carries at its end a pulley 65. The pulley 65 is drivingly coupled to a pulley 66 of a drive motor 67 by a belt 68. The fan chamber section 62 includes an open end 69 through which air is drawn from the cabinet 60 by the impeller wheel and discharged through an outlet 70 in the fan shroud and roof into the building. A diffuser member 71 on the outlet includes adjustable louvers 72 for directing the air generally laterally from the diffuser member and preventing it from being directed downwardly toward the floor of the building.

The impellers of the air handling units are preferably driven at a constant velocity, and atmospheric pressure within the building is maintained at the desired level by admitting a modulated combination of outside air and building return air through the air handling units. Thus, the air handling units discharge a constant volume of air, and the pressure is regulated by varying the proportion of outside air and building return air admitted to the air handling unit. Accordingly, there is provided on the inlet side of the housing 60 an outside air inlet 73 and a building return air inlet 74. The inlets 73 and 74 are provided with adjustable dampers 75 and 76, respectively. As described in applicant's aforementioned patents, the dampers are interconnected so as to operate in opposition and are provided with a suitable actuating mechanism (not shown) operably connected to the control computer 24. A hood 77 having louvered side walls 78 is provided over the inlet 73 for preventing rain and snow from entering the housing 60.

In order to maintain the desired enthalpy relationship between the building atmosphere and the coolant/lubricant compound, it is necessary to observe the wet bulb and dry bulb temperatures of the building atmosphere and regulate the temperature and relative humidity of the air admitted to the building interior by the air handling units accordingly. During periods of warm weather, when the system is operated in the warm weather mode and outside ambient air is admitted directly to the building without heating, or may even be cooled by passing over a chiller, the moisture content of the outside makeup air will generally be sufficient to maintain the desired dry bulb - wet bulb temperature relationship within the building. However, during periods of cool weather, when the system is operated in the cold weather mode, the incoming outside air must be heated and as a result may have a very low relative humidity as it is admitted to the building.

Figure 4:
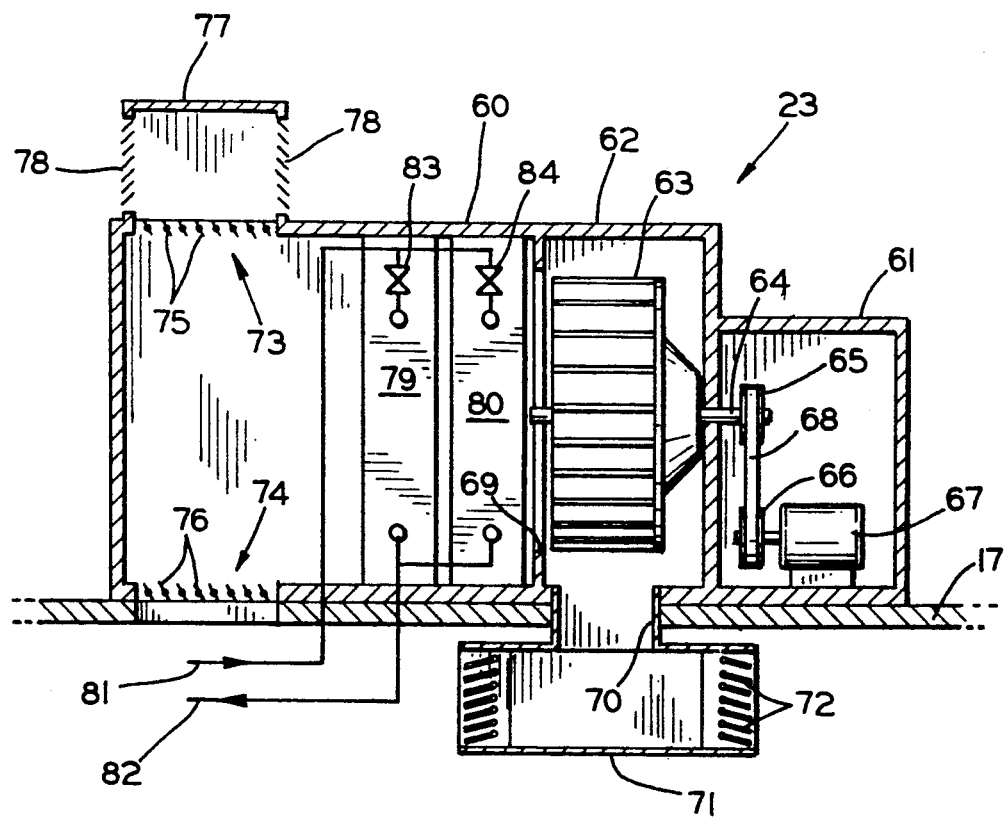
FIG. 4 is an enlarged vertical sectional view of an air handling unit in accordance with the invention, taken substantially along line 4—4 of FIG. 1.

In order to heat the air and add moisture at such times as necessary, there is provided within the air handling units a heating means and a humidifying means. Where the building atmosphere does not include combustible or explosive materials, the heating means may advantageously be a direct fired space heater unit such as disclosed in the aforementioned patents. However, where processes employed in the building involve materials which may be combustible or explosive when dispersed in the atmosphere, such direct-fired heaters are not suitable. For example, the process may utilize a material having a flammable component such as a petroleum-based solvent which might be dispersed in the atmosphere. In such situations, as best shown in FIG. 4, the air handling unit may advantageously be provided with a hot water heat exchanger 79 and an enthalpy controlled evaporator or humidifying means 80 positioned in the flow path of the air through the air handling units. The heat exchangers and evaporators, of conventional construction, are connected by means of inlet and return lines 81 and 82, respectively, to a suitably controlled source (not shown) of heated water. Flow control valves 83 and 84 are provided at the inlets to the heat exchangers and evaporators. The flow control valves are operably connected to the central computer 24 whereby flow of heated water through the heat exchangers and evaporators is regulated in response to observed dry bulb and wet bulb temperature conditions for maintaining those conditions in corresponding areas of the building within the desired parameters.

Figure 3:
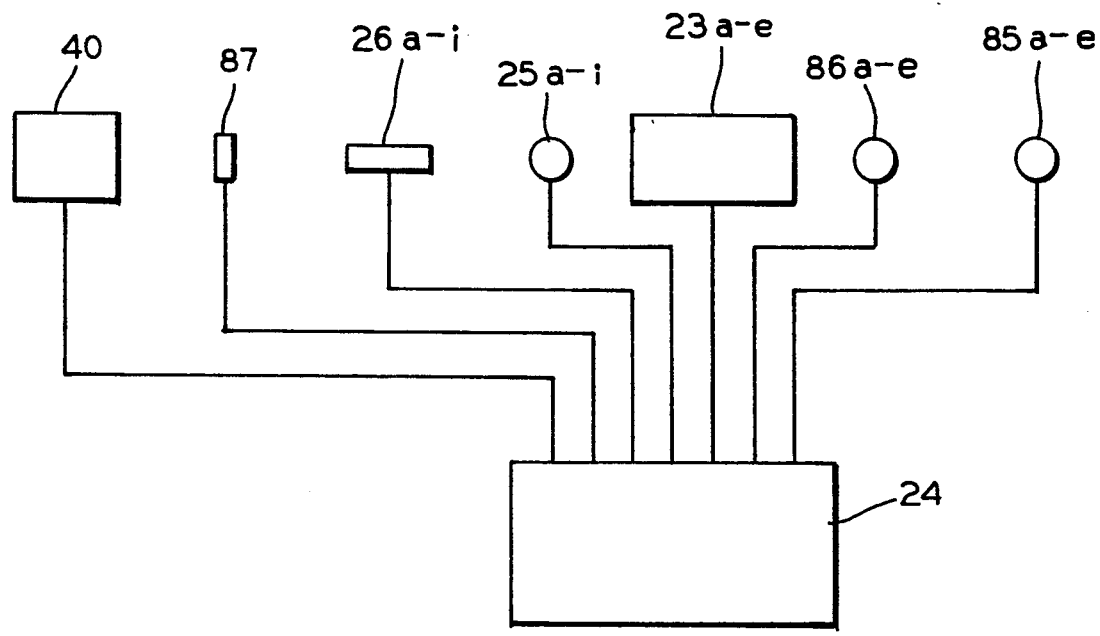
FIG. 3 is a diagram schematically illustrating the data gathering and control system of the invention.

Wet bulb and dry bulb temperature sensors, identified at 85a through 85e and 86a through 86e, respectively, are positioned at strategic locations throughout the building for observing the wet bulb and dry bulb temperatures at their locations and transmitting signals indicative of the observed readings to the central computer 24. One or more temperature probes 87 likewise observe the temperature of the coolant/lubricant compound in the reservoir 38 and transmit signals indicative of the observed temperature to the central computer. As shown schematically in FIG. 3, the controls for the air handling units 23a through 23e, the vent units 26a through 26i, and the cooling system 40, as well as the pressure sensors, 25a through 25i, coolant/lubricant temperature probe 87, the wet bulb temperature sensors 85a through 85e and the dry bulb temperature sensors 86a through 86e, are all operably linked to the central computer 24.

Reviewing briefly operation of the invention, maintenance of a slightly positive atmospheric pressure throughout the building is important in preventing uncontrolled infiltration of outside air and the establishment and maintenance of the desired temperature humidity relationship between the building atmosphere and the coolant/lubricant compound. Thus, the central computer periodically polls the pressure transducers 25a through 25i and compares the observed pressures to stored data indicative of the predetermined desired pressure conditions at those locations. Appropriate corrective measures are initiated by the computer in response to noted deviations from desired pressure conditions, that is, the dampers 75 and 76 of the appropriate one or ones of the air handling units are repositioned to increase or decrease the proportion of outside makeup air relative to building return air being drawn into the air handling units. As described in the aforementioned patents and copending application, various air quality factors may also be observed and corrective measures taken by appropriately regulating selected ones of the air handling units and the relief dampers 26a through 26i.

The central computer also periodically polls the wet bulb and dry bulb temperature sensors 85a through 85e and 86a through 86e and the coolant/lubricant temperature probe 87 to ascertain the respective temperatures. The computer is programmed with stored data indicative of relationships between the wet and dry bulb air temperatures and the liquid coolant/lubricant compound temperature which represent enthalpy conditions whereby the coolant/lubricant will not tend to evaporate into the atmosphere, and the atmosphere will not be receptive to atomized coolant/lubricant. The computer thus compares the observed temperatures to the stored data and, in response to noted deviations, initiates appropriate corrective action. Thus, the coolant/lubricant is generally maintained at or below a predetermined temperature and the computer, in response to the observed temperature, regulates the modulating or mixing valve 58 to maintain the desired temperature. Likewise, the computer periodically polls the temperature sensors 85a to 85e and 86a to 86e and, in response to noted deviations of the actual temperatures from the desired temperature relationships, initiates corrective action as by regulating the flow control valve 83 of the heat exchanger 79 of the appropriate air handling unit or units 23 to adjust the temperature of the air passing through the heat exchanger accordingly. The computer also adjusts the flow control valves 84 on the evaporators 80 of the appropriate air handling unit or units 23a through 23e to regulate the amount of moisture in the air being discharged from the air handling unit. The system is thus able to maintain predetermined wet bulb and dry bulb air temperatures throughout the building, as well as to maintain the liquid coolant/lubricant at or below a predetermined temperature level, whereby entrainment of the coolant/lubricant compound in the building atmosphere is minimized if not entirely eliminated at the source.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

I claim:

1. A method of minimizing dispersal of liquid material utilized within a workplace into the atmosphere of the workplace wherein a supply of the liquid is maintained and liquid is withdrawn from the supply and utilized in a process whereby it is exposed to the atmosphere, comprising observing the temperature of the liquid in said supply of liquid and the dry bulb and the wet bulb temperature of the atmosphere in said workplace, comparing said liquid temperature, said dry bulb temperature and said wet bulb temperatures to corresponding predetermined temperatures which define a relationship between said liquid and said atmosphere whereby said atmosphere is not receptive to said liquid in vaporized form, generating signals indicative of deviations of the observed temperatures from the predetermined temperatures, and adjusting at least one of the liquid temperature, the dry bulb temperature and the wet bulb temperature in response to said signals to establish said relationship between said liquid and said atmosphere.

2. A method of minimizing dispersal of liquid material into the atmosphere as claimed in claim 1, wherein said supply of liquid is maintained at a temperature below a predetermined level.

3. A method of minimizing dispersal of liquid material into the atmosphere as claimed in claim 2, including the step of cooling said supply of liquid to maintain the temperature thereof below a predetermined level.

4. A method of minimizing dispersal of liquid material into the atmosphere as claimed in claim 1, including the step of modifying the temperature of said atmosphere in said workplace to adjust said dry bulb temperature.

5. A method of minimizing dispersal of liquid material into the atmosphere as claimed in claim 4, wherein said atmosphere is heated.

6. A method of minimizing dispersal of liquid material into the atmosphere as claimed in claim 4, wherein said atmosphere is cooled.

7. A method of minimizing dispersal of liquid material into the atmosphere as claimed in claim 4, including the step of modifying the moisture content of said atmosphere in said workplace to adjust said wet bulb temperature.

8. A method of minimizing dispersal of liquid material into the atmosphere as claimed in claim 7, including the step of adding moisture to said atmosphere for increasing the relative humidity thereof.

9. A method of minimizing dispersal of liquid material into the atmosphere as claimed in claim 7, wherein moisture is removed from said atmosphere for decreasing the relative humidity thereof.

10. A method of regulating atmospheric conditions in an enclosed building within at least a portion of which a process utilizing a vaporizable liquid is conducted, including the steps of admitting conditioned air to the building interior at a plurality of locations throughout said building, periodically determining the atmospheric pressure differential between the interior and the exterior at selected second locations around said building and individually regulating the input of conditioned air at each of said plurality of first locations in response to the observed atmospheric pressure at the second locations to maintain the atmospheric pressure throughout the enclosed building above outside atmospheric pressure, maintaining a supply of said vaporizable liquid, withdrawing liquid from said supply and utilizing the withdrawn liquid in said process whereby said liquid is exposed to the atmosphere within said building, determining the temperature of said liquid in said supply of liquid, determining the dry bulb and the wet bulb temperatures of the atmosphere in at least the portion of said building within which said process is conducted, comparing the determined temperature of the liquid in the supply of liquid and the determined dry bulb and wet bulb temperatures of said atmosphere in said portion of said building to corresponding predetermined temperatures having a desired relationship whereby said atmosphere is not receptive to said liquid in vaporized form, and adjusting at least one of said liquid temperature and said wet bulb and dry bulb temperatures of said atmosphere in response to deviations of the determined temperatures from the predetermined temperatures to maintain the determined temperatures within said desired relationship.

11. A method of regulating atmospheric conditions as claimed in claim 10, wherein said supply of liquid is maintained at a temperature below a predetermined level.

12. A method of regulating atmospheric conditions as claimed in claim 11, wherein said supply of liquid is maintained at a temperature not greater than the wet bulb temperature of the atmosphere in the portion of said building within which said process is conducted.

13. A method of regulating atmospheric conditions as claimed in claim 11, wherein said supply of liquid is maintained at a temperature below about 60° F.

14. A method of regulating atmospheric conditions as claimed in claim 10, including the steps of collecting said withdrawn liquid following its utilization in said process, and returning the collected liquid to said supply for recirculation, and removing heat from the supply of liquid to maintain said liquid below a predetermined temperature.

15. A method of regulating atmospheric conditions as claimed in claim 10, including the step of humidifying said conditioned air prior to admitting said air to the building at at least one of said locations for reducing the wet bulb temperature of the atmosphere in the associated portion of the building.

16. A method of regulating atmospheric conditions as claimed in claim 10, including the step of heating said conditioned air prior to admitting said air to the building at at least one of said locations for increasing the dry bulb temperature of the atmosphere in the associated portion of the building.

17. A method of regulating atmospheric conditions as claimed in claim 10, including the step of cooling said conditioned air prior to admitting said air to the building at at least one of said locations for decreasing the dry bulb temperature of the atmosphere in the associated portion of the building.

18. A method of regulating atmospheric conditions as claimed in claim 10, including the steps of heating and humidifying said conditioned air prior to admitting said air to the building at at least one of said locations for increasing the dry bulb temperature and decreasing the wet bulb temperature of the atmosphere in the associated portion of the building.

19. A method of regulating atmospheric conditions as claimed in claim 18, including the step of maintaining said supply of liquid at a temperature not substantially greater than the web bulb temperature of the atmosphere in the portion of said building within which said process is conducted.

20. A method of regulating atmospheric conditions as claimed in claim 10 wherein at least two separate supplies of vaporizable liquid are maintained, each supply providing liquid for a separate one of said processes, and said liquid temperature and said wet bulb and dry bulb temperatures of said atmosphere are determined and adjusted for each of said processes independently from one another.

21. Apparatus for regulating atmospheric conditions within a building or other enclosed space housing a process in which a vaporizable liquid material is exposed to the atmosphere, comprising a plurality of air handling units distributed about said building, at least one of said air handling unit including air temperature regulating and humidifying means for conditioning air and admitting conditioned air in controlled amounts to said enclosed space, means containing a supply of said liquid material, cooling means for controllably removing heat from said liquid material, processing means within said enclosed space adapted to receive liquid material from said supply of liquid material and expose the liquid material to the atmosphere, means sensing the temperature of said liquid material and sending a signal indicative of said temperature to a central computer, means for sensing the dry bulb temperature and the wet bulb temperature of the atmosphere and sending signals indicative of said dry bulb and wet bulb temperatures to said central computer, said computer including means comparing the observed liquid material temperature and wet bulb and dry bulb temperatures to corresponding desired temperature parameters defining a predetermined relationship between said liquid material, wet bulb and dry bulb temperatures whereby the atmosphere is not receptive to said liquid material in vaporized form, and transmitting signals to at least one of said air temperature regulating and humidifying means and said liquid cooling means initiating a response by said at least one of said air conditioning and humidifying means and liquid cooling means bringing the liquid material temperature and wet bulb and dry bulb temperatures within the desired temperature parameters.

22. Apparatus for regulating atmospheric conditions within a building or other enclosed space as claimed in claim 21, wherein said air temperature regulating means of at least one of said air handling unit includes means for controllably heating the air before it is admitted to said enclosed space.

23. Apparatus for regulating atmospheric conditions within a building or other enclosed space as claimed in claim 21, wherein said air temperature regulating means of said at least one air handling unit includes means for controllably cooling the air before it is admitted to said enclosed space.

24. Apparatus for regulating atmospheric conditions within a building or other enclosed space as claimed in claim 21, wherein said air humidifying means comprises a water evaporator through which the air passes for controllably adding water vapor to the air before it is admitted to said enclosed space.

25. Apparatus for regulating atmospheric conditions within a building or other enclosed space as claimed in claim 21, wherein said cooling means for removing heat from said liquid material comprises a heat exchanger, and means for circulating liquid material from said supply of liquid material through said heat exchanger and back to said supply.

26. Apparatus for regulating atmospheric conditions within a building or other enclosed space as claimed in claim 21, including means for collecting spent liquid material from said processing means and returning the collected spent material to said supply of liquid material for recirculation.

27. Apparatus for regulating atmospheric conditions within a building or other enclosed space as claimed in claim 21, wherein each of said air handling units includes air temperature regulating and humidifying means.

28. Apparatus for regulating atmospheric conditions within a building or other enclosed space as claimed in claim 21, including a plurality of said processing means at spaced locations within said enclosed space.

29. Apparatus for regulating atmospheric conditions within a building or other enclosed space as claimed in claim 28, including means for sensing the dry bulb temperature and the wet bulb temperature of the atmosphere in the region of each processing means and sending signals indicative of the observed temperatures to said central computer.

30. Apparatus for regulating atmospheric conditions within a building or other enclosed space as claimed in claim 21, including a separate means containing a supply of liquid material supplying liquid material to each said processing means.

31. Apparatus for regulating atmospheric conditions within a building or other enclosed space as claimed in claim 21, including a plurality of pressure sensor means disposed at selected locations about said building for determining the pressure differential between the interior and the exterior of the building at said selected locations and sending signals indicative of the observed differentials to said central computer, said central computer including means comparing the observed pressure differential to a predetermined desired pressure differential at each pressure sensing means and controlling the appropriate air handling unit or units to maintain the atmospheric pressure throughout said building above the outside atmospheric pressure.

32. Apparatus for regulating atmospheric conditions within a building or other enclosed space as claimed in claim 21, wherein said processing means comprises a line for machining parts including means for depositing said liquid material on said parts and the machining tools, and said liquid material comprises a coolant/lubricant compound.

* * * * *